United States Patent [19]
Wilson

[11] Patent Number: 6,159,518
[45] Date of Patent: Dec. 12, 2000

[54] PROCESS AND WIRE ASSEMBLY FOR SEPARATING DOUGH SHEET FROM ROTATING ROLLER SURFACE

[76] Inventor: Barry F. Wilson, 9526 Ann St., Santa Fe Springs, Calif. 90670

[21] Appl. No.: 09/411,811

[22] Filed: Oct. 1, 1999

[51] Int. Cl.$^7$ ............................... A21C 3/00; A21D 6/00
[52] U.S. Cl. .................. 426/502; 264/169; 425/229; 425/230; 425/363; 425/436 R; 426/389
[58] Field of Search ................................ 426/502, 389; 425/229, 230, 363, 436 R; 264/169

[56] References Cited

U.S. PATENT DOCUMENTS

| | | | |
|---|---|---|---|
| 5,580,583 | 12/1996 | Caridis et al. | 425/363 |
| 5,720,990 | 2/1998 | Lawrence et al. | 426/502 |
| 5,863,566 | 1/1999 | Wood et al. | 426/502 |

*Primary Examiner*—George C. Yeung
*Attorney, Agent, or Firm*—Edgar W. Averill, Jr.

[57] ABSTRACT

A sheeter which includes a wire assembly for separating a sheet of dough from a surface of a rotating roller. The wire assembly is formed from a thin sheet of stainless steel with portions of the sheet removed to form a thin wire-like portion along one edge supported to a base portion by a series of thin support webs. The sheet is supported by a base portion so that the wire portion is held against the outer surface of the rotating roller. In this way, the wire can extend essentially the full width of the roller and the normal band portions which conventionally hold a wire against the surface of the roller are eliminated. Preferably, the thin sheet is vibrated to prevent any buildup of foodstuffs on an upper surface of the sheet.

16 Claims, 3 Drawing Sheets

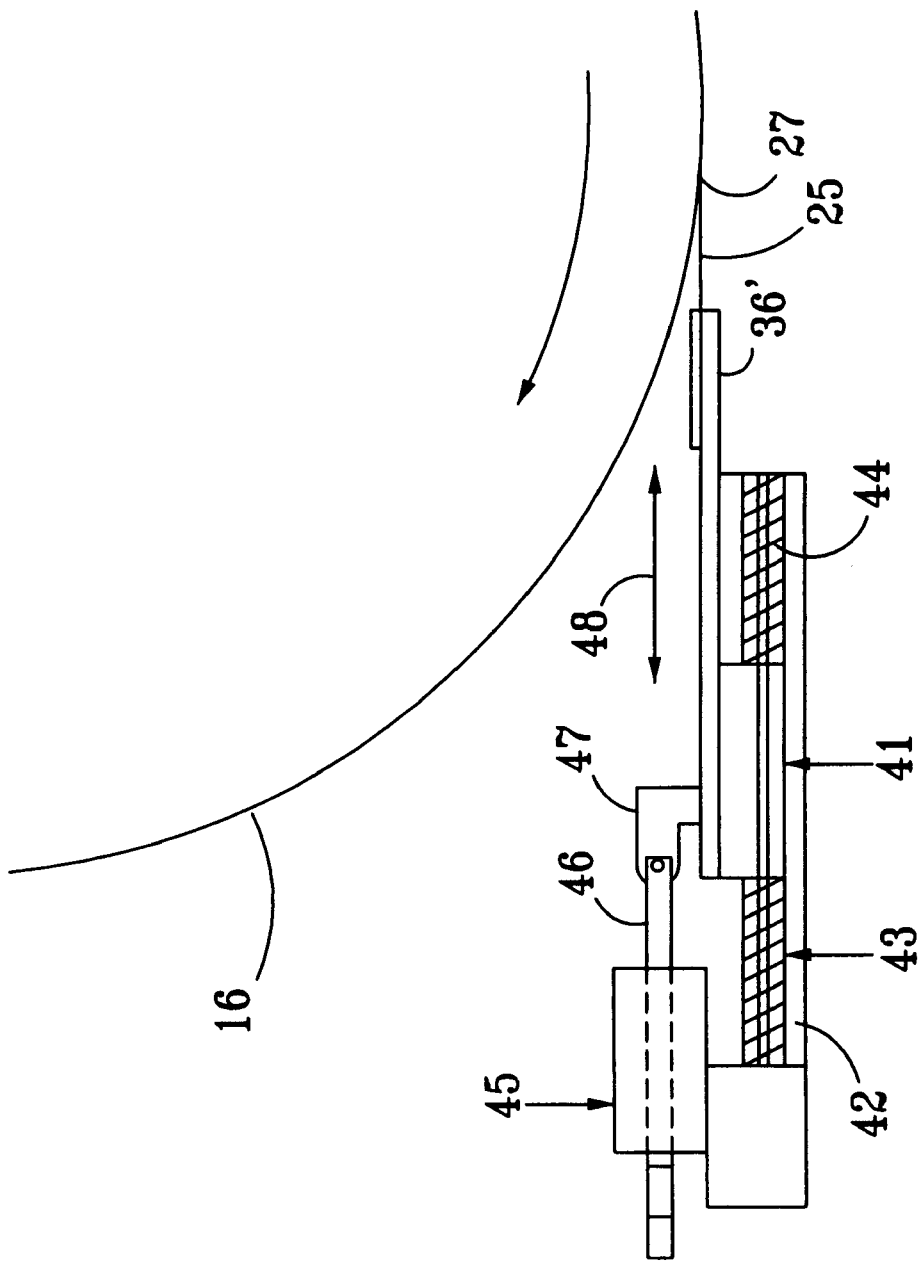

PROCESS AND WIRE ASSEMBLY FOR SEPARATING DOUGH SHEET FROM ROTATING ROLLER SURFACE

BACKGROUND OF THE INVENTION

The field of the invention is food processing and the invention relates more particularly to the forming of thin flat foods, such as corn chips or tortillas. Most commonly, such thin sheets of dough are formed on the surface of a rotating sheeter roller and removed by a wire separator which is held against the surface of the roller by a series of plastic bands held in grooves formed in the roller.

There are several disadvantages to the holding of a separator wire by plastic bands. One difficulty is that the wire quite often breaks which shuts down production, thereby increasing the cost of production. U.S. Pat. No. 5,720,990 discusses a process for reducing the frequency of breaks in the wire, but, of course, such process does not completely eliminate such breaks and the process also increases the amount of wire used. Another shortcoming of the use of bands to hold a separator wire against a roller surface is that the width of the bands cannot be used for food products and instead the dough over the bands is carried around the roller to be reprocessed, thereby reducing the amount of sheeted product that can be produced by 10–20%.

Experimental attempts have been made to support a blade externally of the roller to eliminate the bands and the wire but such attempts have been unsuccessful. A buildup of dough has occurred on the upper surface of the blade which dough occasionally falls off. This creates an undesirable particle of dough which falls in with the desirable food product, such as corn chips. It should be noted that corn dough or masa is much more difficult to remove from a roller than wheat flour as it is relatively sticky and does not hold together as well as dough made from wheat flour.

BRIEF SUMMARY OF THE INVENTION

It is an object of the present invention to provide a wire separator assembly which does not utilize bands to hold a wire against the surface of a roller.

The present invention is for a sheeter, including means for separating a sheet of dough from a surface of a rotating roller, said rotating roller having a roller width. Said means for separating the sheet of dough comprises a separator wire held adjacent the surface of the rotating roller. A plurality of separator wire support webs are affixed at an outer end to the separator wire and at an inner end to a base. The base is held near the outer surface of the roller and positioned so that the separator wire portion is held against the surface of the roller. Preferably, the separator wire is formed by cutting out openings in a thin sheet of stainless steel having a thickness of between 0.01" and 0.02".

The present invention is also for a process for removing a sheet of dough from a surface of a rotating roller comprising the steps of supporting a thin band by a plurality of thin web members extending in a direction away from a rotating roller. The thin band is held by a plurality of thin web members extending between the thin band and a support base. The thin band is pressed against the surface of the rotating roller to separate a sheet of dough from the surface of the rotating roller. The process includes preferably the further step of vibrating the thin band through the support base during the pressing step to eliminate any buildup of dough on the upper surface of the thin web members.

BRIEF DESCRIPTION OF THE DRAWINGS

FIG. 11 is a side view of an alternate embodiment of a support assembly for the separator/wire assembly of the sheeter of FIG. 1.

DESCRIPTION OF THE PREFERRED EMBODIMENTS

Figure 1:
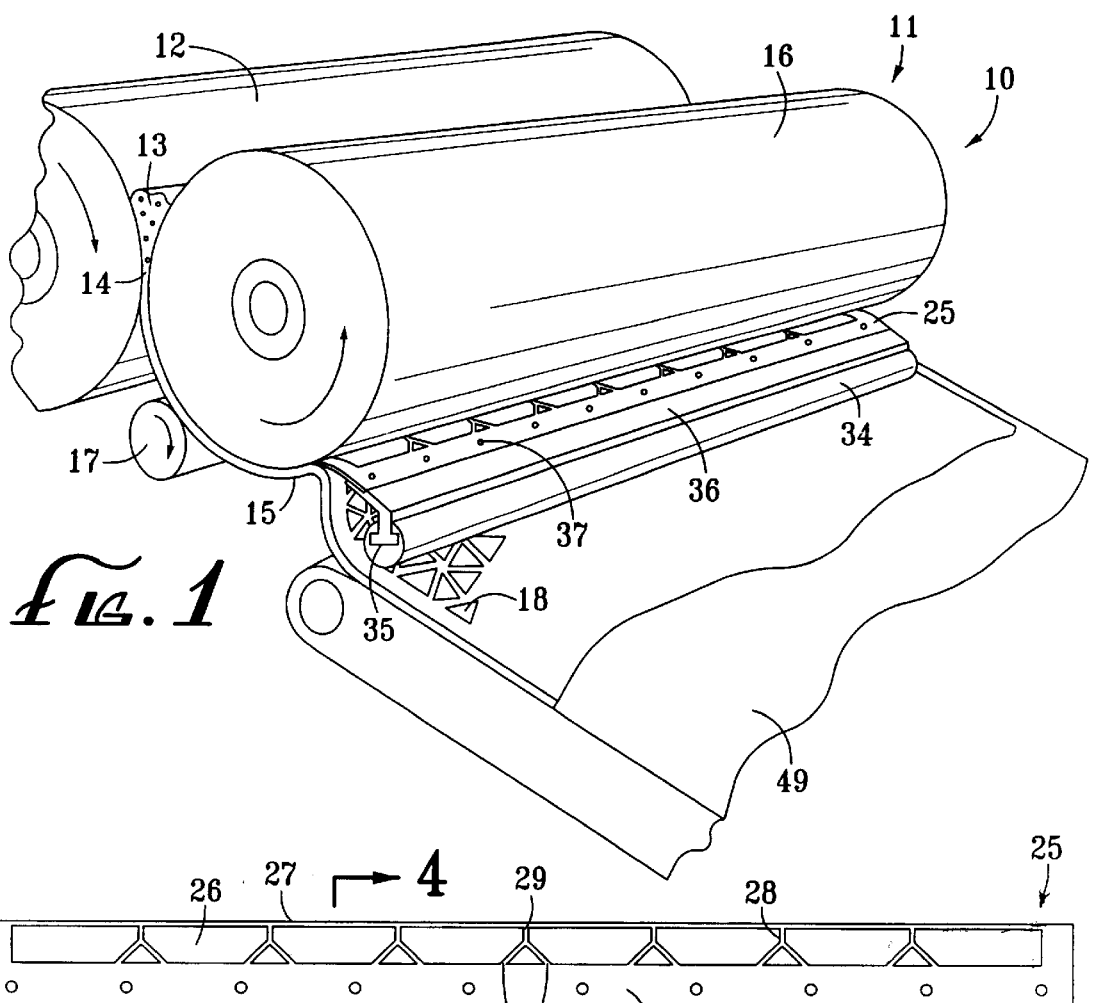
FIG. 1 is a perspective view of the sheeter of the present invention.

The sheeter of the present invention is shown in perspective view in FIG. 1 and indicated generally by reference character 10. Sheeter 10 has a rotating sheeter roller 11 which is mounted adjacent a press roller 12. A quantity of dough 13, such as masa, is held above a nip 14 between the two rollers. The masa 13 is formed into a sheet of dough 15 which is carried on the surface 16 of rotating sheeter roller 11. A cutter roller 17 is held against the sheeted dough 15 and forms the desired shape of food product. Triangular chips 18 are shown in FIG. 1 having been deposited on conveyor 49, although, of course, other shapes such as rectangles or circles may alternatively be formed.

Figure 5:
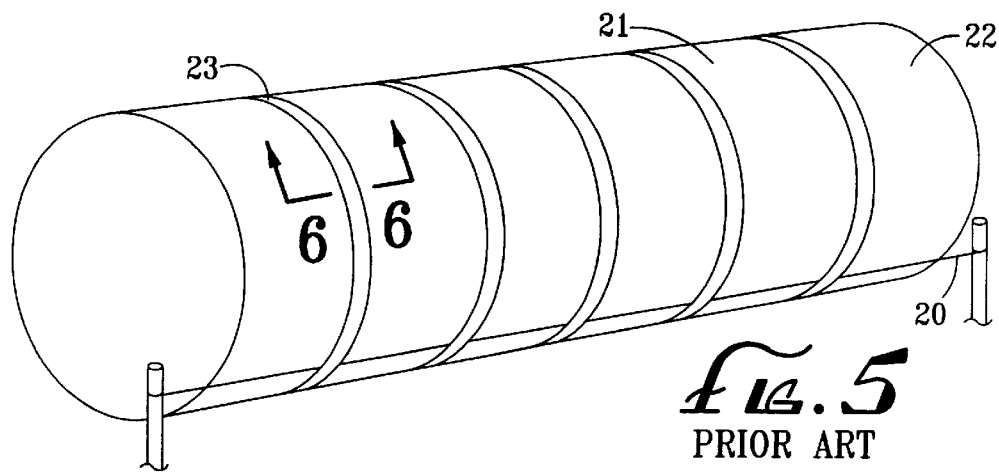
FIG. 5 is a perspective view of a prior art rotating sheeter roller, including a wire held by a plurality of plastic bands.
Figure 6:
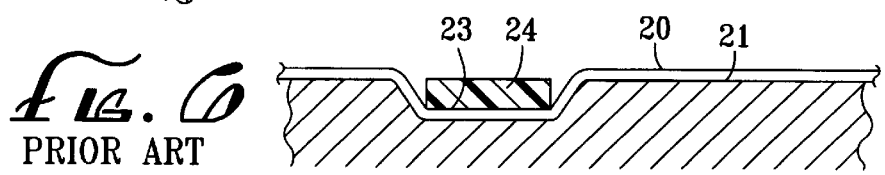
FIG. 6 is an enlarged cross-sectional view of the prior art assembly taken along line 6—6 of FIG. 5.

Turning now to the prior art method shown in FIG. 5, a separator wire 20 is held in tension against the surface 21 of prior art sheeter roller 22. Sheeter roller 22 has a series of grooves 23 shown best in FIG. 6. Each groove holds a plastic band 24 which pulls the separator wire 20 into groove 23 and holds the separator wire against the surface 21. As pointed out in U.S. Pat. No. 5,750,990, which is incorporated by reference herein, such an arrangement causes frequent wire breakage (often daily) which severally interrupts production.

Figure 2:
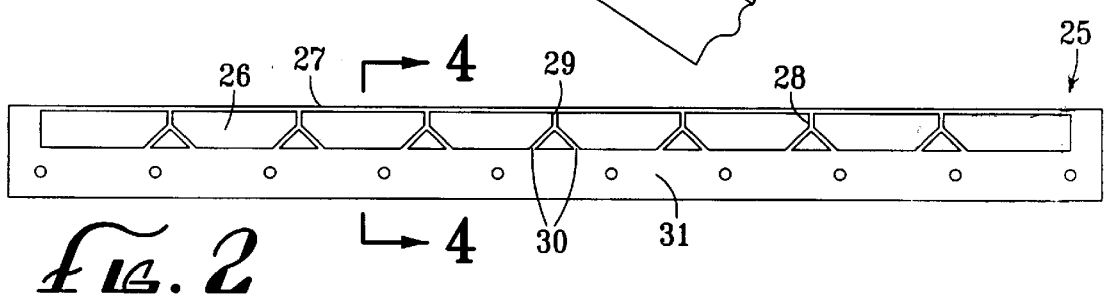
FIG. 2 is a plan view of the separator wire assembly of the sheeter of FIG. 1.
Figure 4:
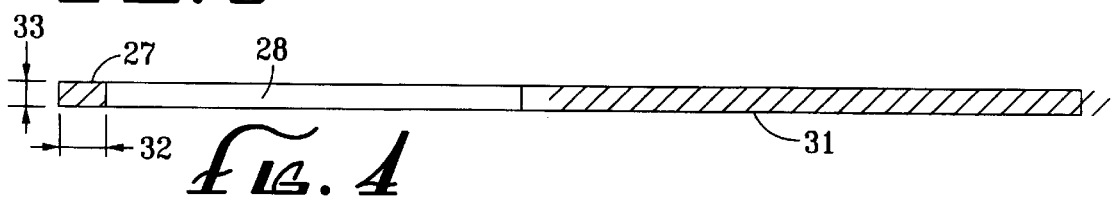
FIG. 4 is an enlarged cross-sectional view taken along line 4—4 of FIG. 2.

Returning now to FIG. 1, it can be seen that rotating sheeter roller 11 does not have any grooves and, instead, a separator wire assembly 25 is held against surface 16 of roller 11. The details of construction of a separator wire is shown in FIG. 2 where it can be seen that the separator wire assembly 25 is formed from a thin sheet of material such as stainless steel which has a series of open areas 26. Open areas 26 are shaped to form a separator wire 27 and a series of separated wire support webs 28. The open area is at least 90% open and preferably 99% open. The separated wire support webs 28 of FIG. 2 are formed in an inverted "Y" shape with the outer end 29 or base of the "Y" affixed to separator wire 27 and the inner end 30 connected to a separator wire support base 31. The open areas and webs are preferably formed by laser cutting which provides an accurate way of producing a separator wire 27 of uniform width. The width of the separator wire is indicated by reference character 32 in FIG. 4 and is preferably between 0.02" and 0.10". The thickness of the separator wire assembly is indicated by reference character 33 in FIG. 4 and is preferably between 0.01" and 0.02" and, ideally, about 0.016". This provides a relatively fine separator wire 27 which functions in a manner analogous to the prior art separator wire except that it does not need any grooves or bands, but instead is supported completely externally. One means for holding the support wire is indicated in FIG. 1 where a rod 34 has an elongated groove 35 which holds a wire assembly support arm 36. Wire assembly support arm 36 provides a base for the attachment of separator wire assembly 25 such as by screws 37.

Figure 9:
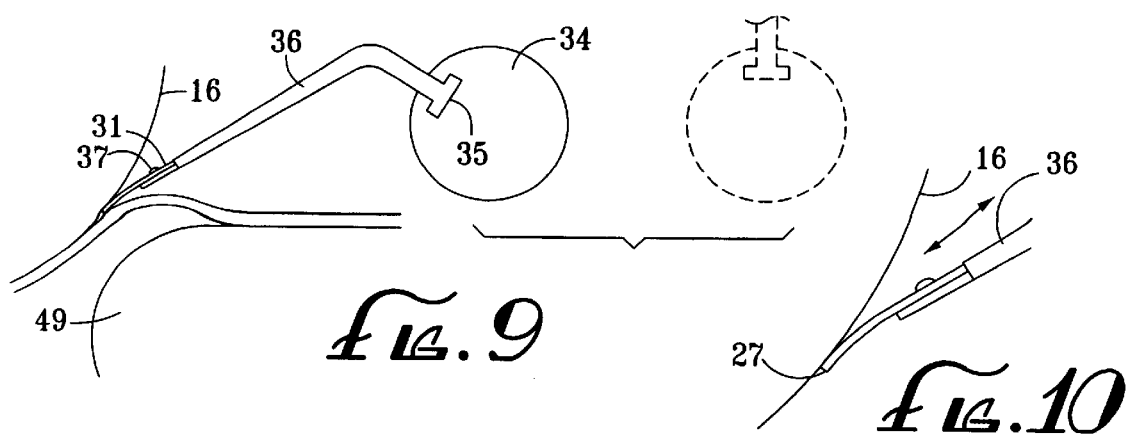
FIG. 9 is a side view of a support assembly for the separator wire assembly of the sheeter of FIG. 1.

As indicated best in FIG. 9, in the event it becomes necessary to replace separator wire assembly 25, the wire assembly support arm is moved horizontally to the right as shown in FIG. 9 and then rotated in a clockwise manner so that the wire assembly support arm 36 may be slid out of groove 35 and a new one slid in place. Then the separator wire assembly 25 can be removed and a new one placed on the removed wire assembly support arm at a remote location.

Figure 3:
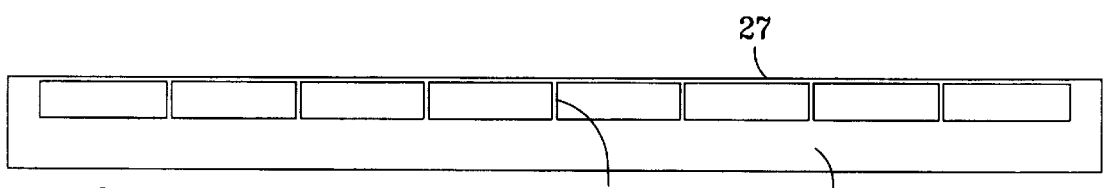
FIG. 3 is a plan view of an alternate embodiment of the separator wire assembly of the sheeter of FIG. 1.

Another alternate version of support webs is shown in FIG. 3 where a series of straight webs 38 hold separator wire 27 to base 31.

Figure 10:
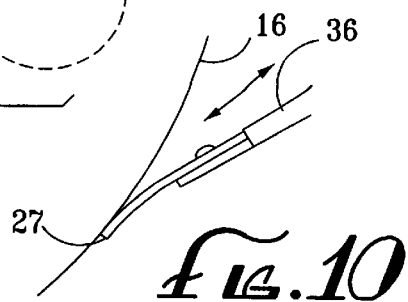
FIG. 10 is an enlarged view of the separator wire assembly as it contacts the surface of the sheeter roller of FIG. 1.

It has been discovered that tiny amounts of dough can build up on the upper surface of the thin support webs 28 or 38. Although the amount of dough is extremely small, it can be eliminated by vibrating the separator wire assembly 25 in and out as indicated in FIG. 10. By doing so, any dough building up on the upper surface of the support webs is removed before it can reach any noticeable size.

One method of inducing vibration to the separator wire assembly 25 is indicated in FIG. 11. Separator wire assembly 25 is held to wire assembly support arm 36' which, in turn, is supported on a carriage 41. Carriage 41 is slidably supported on blade carrier frame 42. Carriage 41 is supported in a neutral position between springs 43 and 44. A magnetic coil 45 oscillates coil arm 46 which is connected through tab 47 to carriage 41. This causes wire assembly support arm 36' to vibrate in the direction indicated by arrow 48.

The frequency of vibration can be less than 20,000 cycles per second. Frequencies of between 30 and 50 pulses per second have proved successful. The amplitude of the vibration of the support base is preferably between 0.001" and 0.005".

It is preferable that front spring 44 be lighter than rear spring 43 which accents the front to rear oscillation. The magnetic field may be controlled by a high speed transistor output of the PLC connected to a solid state relay suppressed and coupled with an R.C. dummy load at the coil side of the relay. While this vibrating system has been successfully tested, the present invention, of course, is not limited to this pulse rate or motion creating assembly. The combination of the very thin separator wire, the thin support webs and the vibration essentially completely eliminates the dough buildup.

Figure 7:
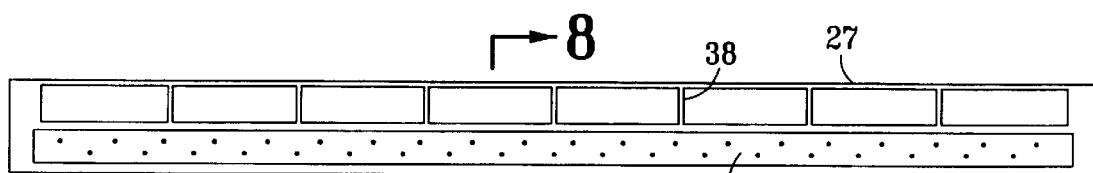
FIG. 7 is a plan view of an alternate embodiment of separator wire assembly useful for the sheeter of FIG. 1.
Figure 8:
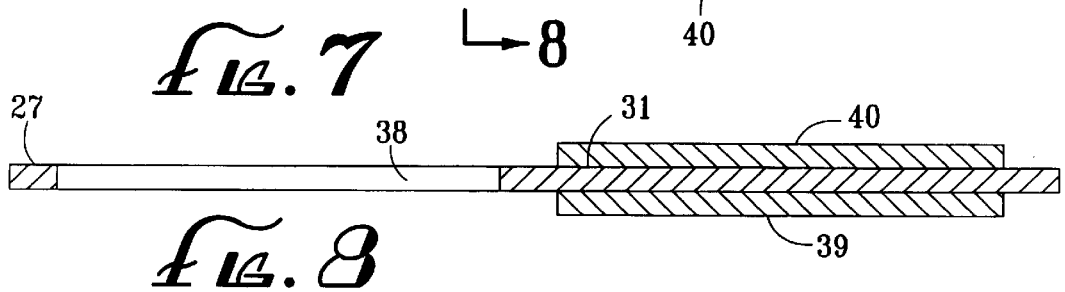
FIG. 8 is an enlarged cross-sectional view taken along line 8—8 of FIG. 7.

It has been found preferable to place the support wire assembly 25 under tension as indicated by arrows 42 in FIG. 7. This can be accomplished by placing the separator wire assembly 25 under tension, such as 10–20 lbs. and spot welding 43 one or preferably two tension sheets 39 and 40. This sandwiches the separator wire assembly between the two tension sheets 39 and 40, as shown in FIGS. 7 and 8. This has an effect similar to that of stretching the separator wire 20 of the prior art. Tension sheets 39 and 41 can be made from stainless steel of the same thickness as the separator wire assembly 25.

The result is a full width separator which lays sheet of dough 15 on the upper surface of conveyor belt 49 without the wasted space created by grooves 23 and plastic band 24 of the prior art assembly. Thus, production can be increased by approximately 20% in addition to the elimination of wire breakage. It is contemplated that two thin strips along the outer edges of sheet 15 would be recirculated to dough mass 13 so that the cut sheet will have a smooth edge.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A sheeter including means for separating a sheet of dough from a surface of a rotating roller, said rotating roller having a roller width, said means for separating the sheet comprising:

a separator wire held adjacent the surface of the rotating roller;

a plurality of separator wire support webs affixed at an outer end to said separator wire, said wire support webs having an inner ends and said wire support webs being spaced apart and defining an open area between said wire support webs;

a separator wire support base affixed to the inner ends of said wire support webs; and means for holding said separator wire support base so that the separator wire is supported against the surface of said rotating roller.

2. The sheeter of claim 1 wherein said separator wire has a thickness of between about 0.01" and 0.02".

3. The sheeter of claim 1 wherein said separator wire has a width of between 0.02" and 0.10".

4. The sheeter of claim 1 wherein said separator wire is formed along an outer edge of a sheet of material having a thickness of between 0.01" and 0.02".

5. The sheeter of claim 4 wherein said material is stainless steel.

6. A process for removing a sheet of dough from a surface of a rotating roller to deposit the sheet on a conveyor surface without utilizing a wire separator held against the surface of the roller by bands embedded in grooves in the roller surface comprising:

supporting a thin band by a plurality of thin web members extending in a direction away from said rotating roller, said thin web members extending between said thin band and a support base, said thin web members being separated so that an area between the thin web members is at least 90 per cent open; and pressing said thin band against the surface of said rotating roller so that the thin band separates the sheet of dough from the surface of the rotating roller.

7. The process of claim 6 wherein said thin band, said thin web members and said support base are vibrated during said pressing step to create a vibration of said thin web members and said support base.

8. The process of claim 7 wherein said vibration is in a direction normal to a longitudinal axis of said support base.

9. The process of claim 7 wherein said base is vibrated at a frequency of less than 20,000 cycles per second.

10. The process of claim 7 wherein the amplitude of said vibration of said support base is between 0.001 and 0.005 inches.

11. The process of claim 6 further including the steps of holding said thin band under tension and while under tension affixing at least one tension sheet to a surface of said band and after said affixing step releasing the tension to maintain a tension force in said band.

12. A wire assembly for separating a sheet of dough from a surface of a rotating roller comprising an elongated sheet of metal having a thickness of between 0.01 and 0.02 inches, said elongated sheet of metal having a wire edge a base edge, a first end, a second end, an upper surface and a lower surface, said sheet of metal having areas removed to form a wire portion along said wire edge supported by thin web strands of metal dimensioned to form a wire support area comprised of no more than ten per cent web strands and the balance open area and said thin web strands being held by a base portion of said elongated sheet of metal.

13. The wire assembly of claim 12 wherein said thin web strands are formed in the shape of "Y"s with a base of each Y held to said wire portion and the ends of each of said Y held to said base portion.

14. The wire assembly of claim 12 wherein said wire support area is no more than about 1% web strands.

15. The wire assembly of claim 14 wherein said elongated sheet of metal is stainless steel having a thickness of about 0.016'.

16. The wire assembly of claim 12 further including a pair of tension sheets affixed to the upper and lower surfaces of said base portion.

* * * * *